(12) United States Patent
Gasparre et al.

(10) Patent No.: US 8,172,419 B1
(45) Date of Patent: May 8, 2012

(54) ENHANCED LIGHTING DEVICE

(76) Inventors: RoseAnna Elizabeth Gasparre, Ft. Worth, TX (US); Jennifer Jo Dick, Mansfield, TX (US)

( * ) Notice: Subject to any disclaimer, the term of this patent is extended or adjusted under 35 U.S.C. 154(b) by 574 days.

(21) Appl. No.: 12/231,004

(22) Filed: Aug. 28, 2008

Related U.S. Application Data

(60) Provisional application No. 61/002,064, filed on Nov. 6, 2007.

(51) Int. Cl.
   *F21V 21/08* (2006.01)
(52) U.S. Cl. ........ 362/103; 362/104; 362/105; 362/106; 362/107; 362/108
(58) Field of Classification Search ........... 362/103–108
   See application file for complete search history.

(56) References Cited

U.S. PATENT DOCUMENTS

| | | | | |
|---|---|---|---|---|
| 6,290,368 | B1 * | 9/2001 | Lehrer | 362/103 |
| 6,764,194 | B1 * | 7/2004 | Cooper | 362/105 |
| 2005/0248932 | A1 * | 11/2005 | Waters | 362/105 |

* cited by examiner

*Primary Examiner* — William Carter
(74) *Attorney, Agent, or Firm* — Jeffrey Roddy

(57) ABSTRACT

An enhanced lighting device having a means providing for the affixing to most conventional eyeglass frames. The unobtrusive lighting device generally comprises an enclosure having a cavity for the containment of a light emitting diode, a powering means and a sliding tensionable clamp for attaching the enclosure to for example, the bridge of a pair of conventional eyeglasses. Additionally, a pair of support posts provides an alignment means whereby the direction of the light is perpendicular to that of the eyeglass frame. A presentation plate is attachable to the front of the device, and may be decorated to provide a fashionable look.

2 Claims, 4 Drawing Sheets

ENHANCED LIGHTING DEVICE

CROSS REFERENCE TO RELATED APPLICATIONS

This application claims the benefit of Provisional Patent Application No. 61/002,064 filed Nov. 6, 2007

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

BACKGROUND OF THE INVENTION

It is well known that there have been described various illuminating devices to serve as seeing aids in low light conditions in the past that have been attachable or integrated into a pair of eyeglasses. Although these devices work well for their intended purpose they are bulky, being difficult to attach to, and detach from to a conventional eyeglass frame and lacking subtlety because of their size. Some such devices intended to be mounted on the earpiece of an eyeglass frame must be readjusted frequently. What is needed is a lighted device that provides unobtrusiveness, ease of application, removal and light direction that will attach to the bridge of most conventional eyeglass frames.

SUMMARY OF THE INVENTION

The present invention relates broadly to light emitting devices, and more particularly to reading aids in low light conditions. It is attachable to the bridge of the majority of conventional eyeglass frames, either plastic or wireframe, without being obtrusive and disturbing a user's line of sight. The means of attaching the present invention to the bridge is by a sliding clamp with a pair of support posts that hold the light perpendicular to the eyeglass frame, so that the light is directed by moving the head. Additionally, a removable presentation plate may be attached to the front of the device to match with, or contrast with the eyeglass frame or the user's apparel for a fashionable look.

One objective of the present invention is to provide a small unobtrusive lighting device attachable to most conventional eyeglass frames for use in low light conditions.

Yet another objective of the present invention is to provide a means of fashionable expression by including presentation plates that may applied to the face of the lighting device.

Still another objective is to provide a lighting device that in the absence of eyeglass frames, may be applied directly to a user's clothing such as a lapel.

DETAILED DESCRIPTION OF THE EMBODIMENTS

Figure 1:
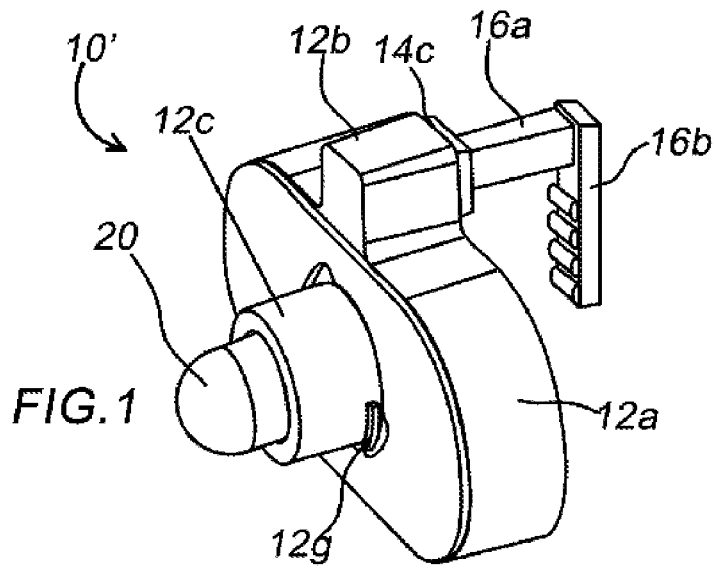
FIG. 1 is a frontward perspective view of the device 10'.
Figure 2:
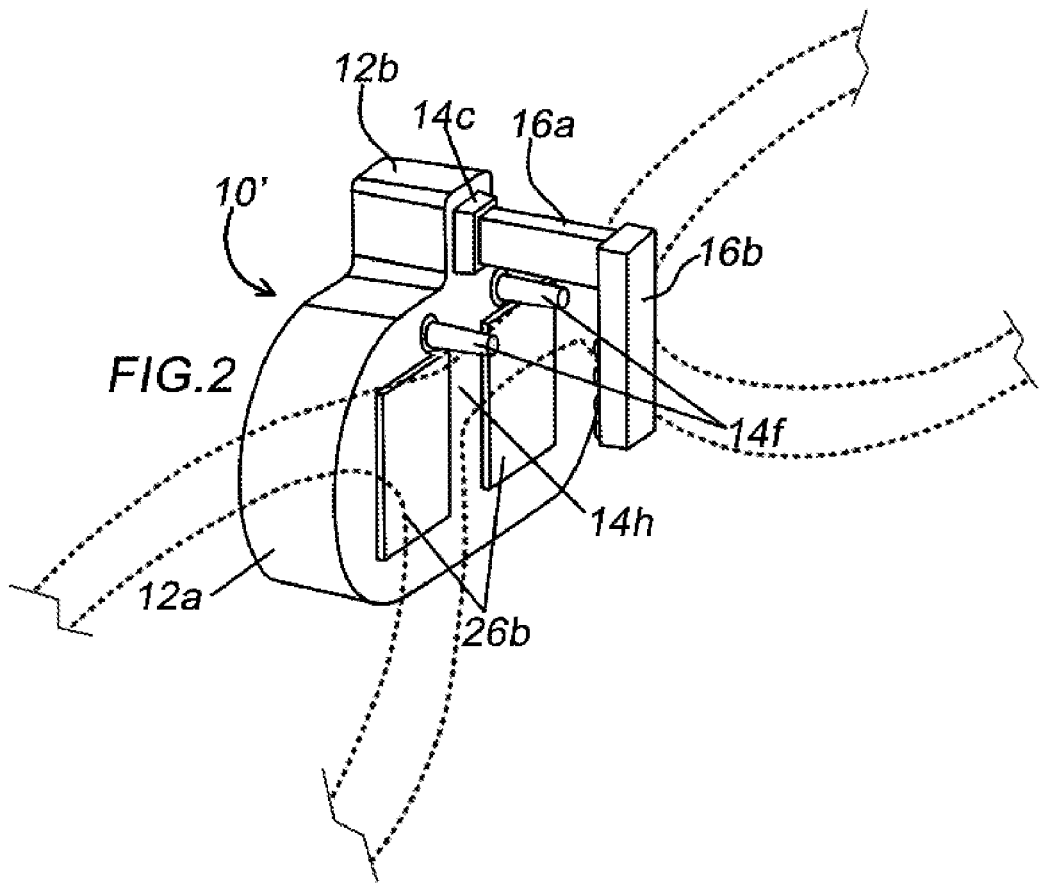
FIG. 2 is an rearward perspective rearward view of the device 10'.

Referring to FIGS. 1-2; a surface attachable lighting device 10' with a light and enclosure is shown with a sliding clamp for affixing the device to a surface; preferably that of the bridge section of an eyeglass frame as an aid to seeing in low light conditions. The present invention includes a case body 12a and a back plate 14a forming an enclosure allowing for the insertion of a sliding clamp having a horizontal sliding post 16a portion that may be inserted into and retracted from an orifice 14c formed from the back plate 14a. The sliding post is joined at substantially a right angle to a vertically oriented portion 16b for contact and gripping of a surface. Orifice 14c opens into a recess defined by 12b formed from the case body 12a. Movement of the sliding post inwardly inside the recess draws the vertical portion 16b toward the back plate. In this way, an attachment surface, preferably the bridge section of an eyeglass frame, is drawn closer to the back plate until the bridge section contacts and presses upon a moveable conductive contact plate 26 two sections of which are exposed through apertures 14g in the back plate 14a. Also shown are two bridge support posts 14f that rest atop the eyeglass bridge to align the sliding clamp with the bridge while orienting the light perpendicularly to the bridge. As will be appreciated by one skilled in the art, the case body and all parts excluding the light, batteries and contact plate are preferably and readily constructed from injection molded plastic owing to the relatively low cost, but may also be made of cast resin, stamped metal or any other material suitable for a light enclosure of this type. While optimally the sliding clamp allows for the affixing of the present invention to the bridge of an eyeglass frame, it may be used with a lapel of a coat, the brim of a hat and the front pleat of a button up shirt among others.

Figure 3:
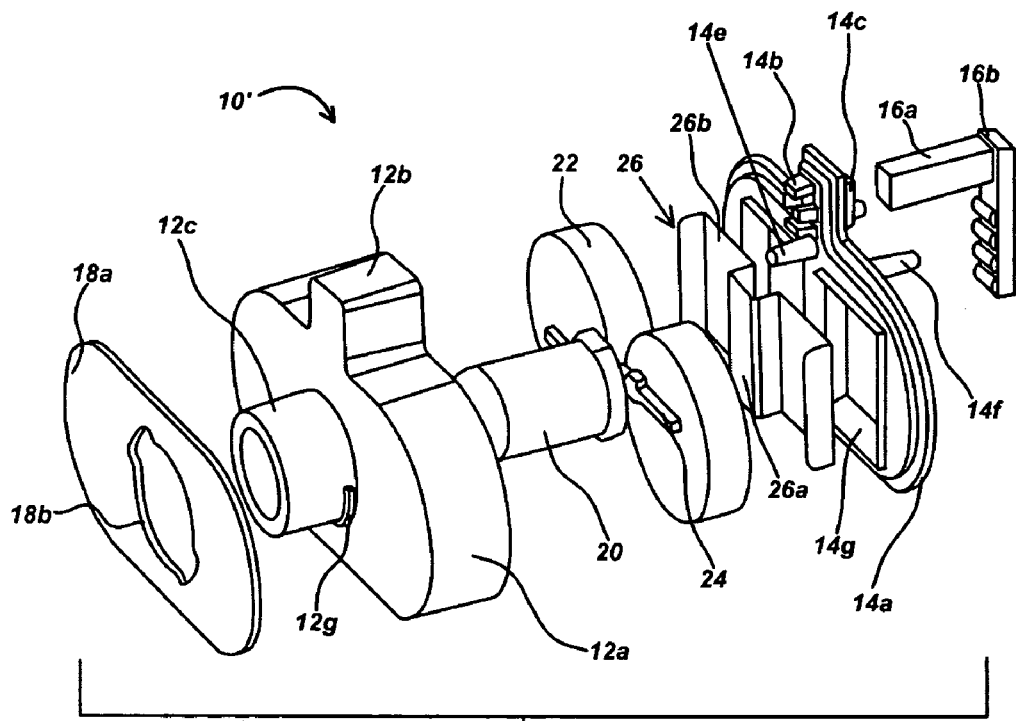
FIG. 3 is a forward exploded view device 10'.
Figure 4:
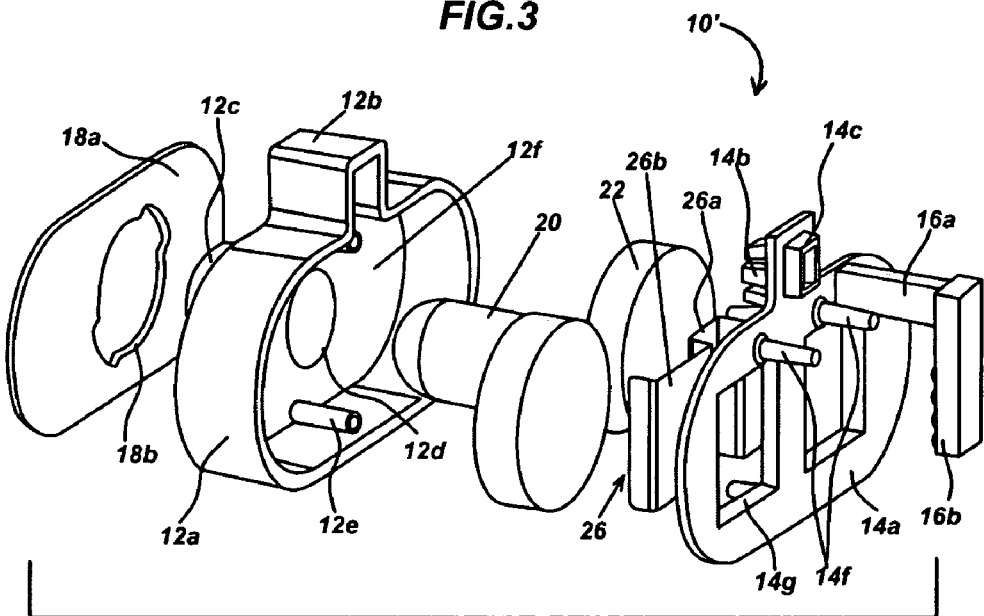
FIG. 4 is a rearward exploded view of the device 10'.

As shown in FIGS. 3-4, the device includes a case body 12a, an LED 20 with the connectors 24 bent flat for contact with the batteries 22. The back plate 14a has two substantially rectangular apertures 14g separated by a midsection 14h for mating with the medial channel 26a of a moveable contact plate 26 which has two wing sections 26b that upon assembly, protrude partially from the surface of the back plate. The moveable contact plate is biased with the medial channel held fixed by the midsection of the back plate so when the wing sections are pressed by the bridge of an eyeglass frame or any surface, the wing sections flex inwardly contacting the batteries and closing the circuit. Releasing the pressure causes the contact plate to resume a resting state away from the batteries so that the light turns off when it is removed from the eyeglass frame. While the arrangement of moveable contact plate in relationship to the power source is the preferred method of turning the device on, it should be understood that a on/off switch such as a single pole throw may be use as well, either to replace or compliment the contact plate. The case body has a LED insertion tube 12c with two angled molded threads 12g on opposite sides of the insertion tube just above the point where the insertion tube intersects the front face of the case body 12a. The angled threads are designed for the securing of a presentation plate 18a circumjacent the insertion tube 12c with the angled threads passing through notches in aperture 18b, so that by a twisting motion, the presentation plate is affixed to the front face of the case body. The presentation plate may be plain or decorated to lend fashion appeal to the device.

Figure 5:
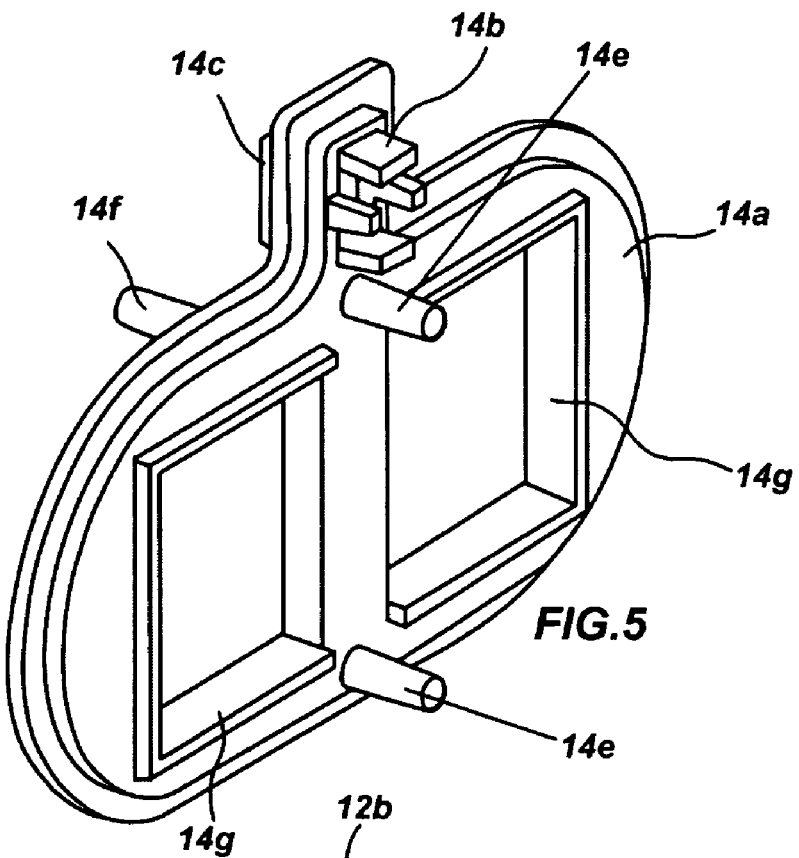
FIG. 5 is a detail perspective view of the interior side of the back plate.
Figure 6:
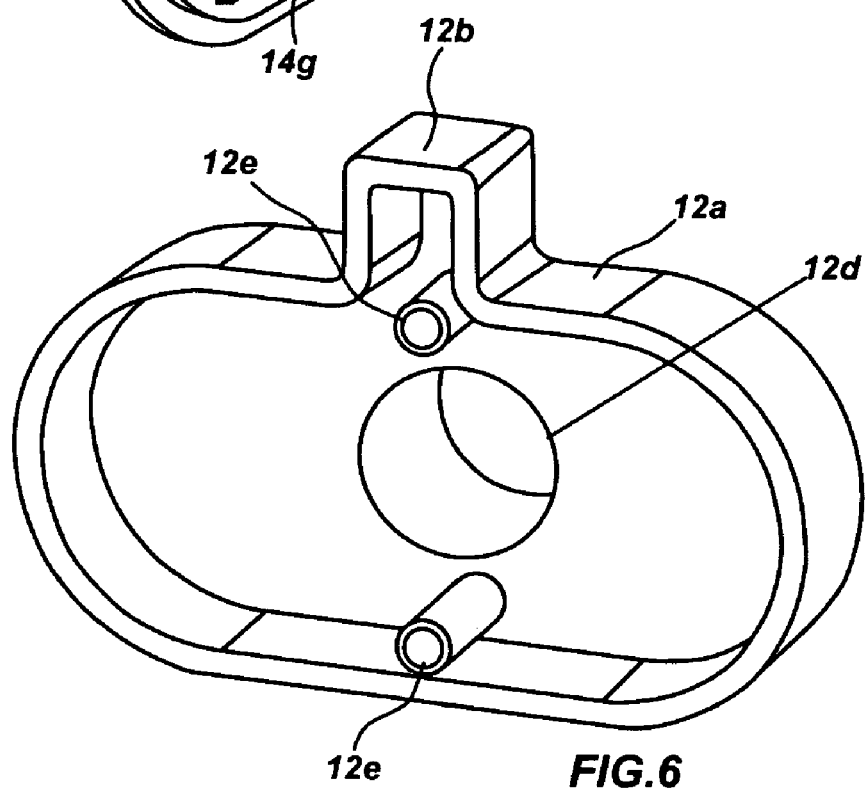
FIG. 6 is a detail perspective view of the interior side of the case body.
Figure 7:
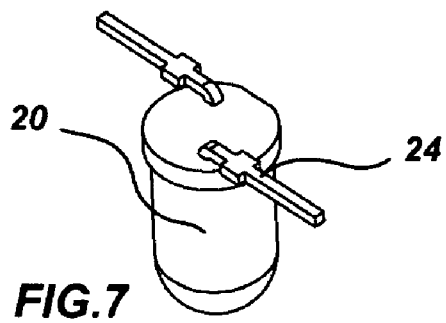
FIG. 7 is a perspective view of the LED and terminals.
Figure 8:
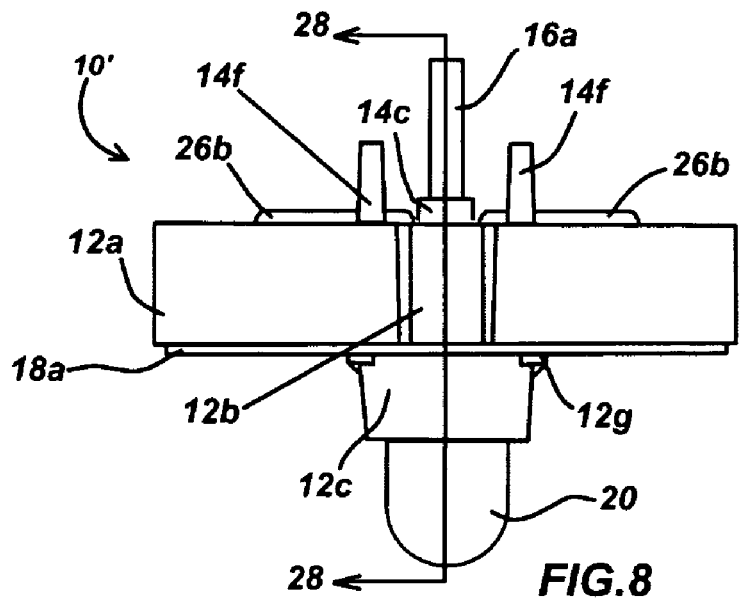
FIG. 8 is a top plan view of the device 10'.
Figure 9:
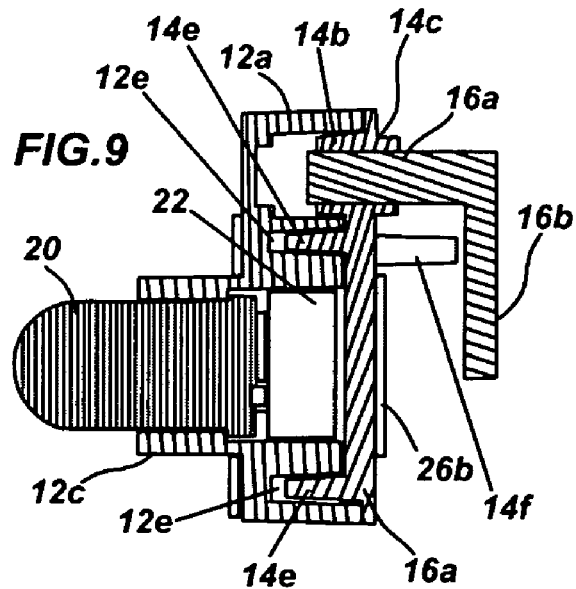
FIG. 9 is a sectional view taken along lines 28-28 of FIG. 8.

FIGS. 5-6 show respectively, the back plate 14a with an array of molded teeth 14b opposite orifice 14c on the interior side of the back plate that are biased inwardly to encircle and grip the sliding post 16a on insertion providing a friction fit whereby the sliding clamp is tensioned gripping a surface, two rectangular apertures 14g that are each molded with a ridge on three sides for the seating and securing of the moveable contact plate in position. The press posts 14e are inserted either by friction fit, or by gluing during assembly into a pair of receivers 12e to hold the back plate and case body together. Shown also is the interior opening 12d to the insertion tube 12c FIGS. 7-9 show in order the LED 20; While preferably a type RL5-W10015 being used in combination with two batteries of type CR1025 which will give approximately 168 hours of life when used with the specified LED, it should be understood that various other combinations of LED and batteries may extend or reduce the hours of life; FIG. 8 shows a top plan view of the present embodiment is shown with FIG. 9 being a sectional view taken along lines 28-28 of the embodiment of FIG. 8 showing the fitting together of the case body 12a and the back plate 14a, the position of the light within the insertion tube portion of 12a, and the position of the batteries 22 within the enclosure.

While the invention has been described by the embodiment given, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A surface attached light attachable to the bridge of a pair of eyeglasses comprising:
   1) an enclosure,
   2) a plurality of batteries within the enclosure,
   3) an insertion tube for at least one light emitting diode,
   4) a circuit for powering the light emitting diode,
   5) a sliding tensionable clamp for affixing the enclosure to a surface having a first sliding element joined at substantially a right angle to a gripping element in which moving the first sliding element varies a distance between the surface and the enclosure,
   6) a pair of alignment and support elements extending from side of enclosure facing the surface that provide support for the bridge, and,
   7) a moveable plate disposed between the light emitting diode and the sliding tensionable clamp for closing the circuit and powering the light emitting diode in which the moveable plate is compressed by contact with the surface by slidable movement of the sliding tensionable clamp.

2. The surface attached light of claim 1, further comprising a decorative presentation plate affixed circumjacent the insertion tube.

* * * * *